(No Model.)
A. HOGUET.
MACHINE FOR MASHING POTATOES, &c.
No. 244,604. Patented July 19, 1881.
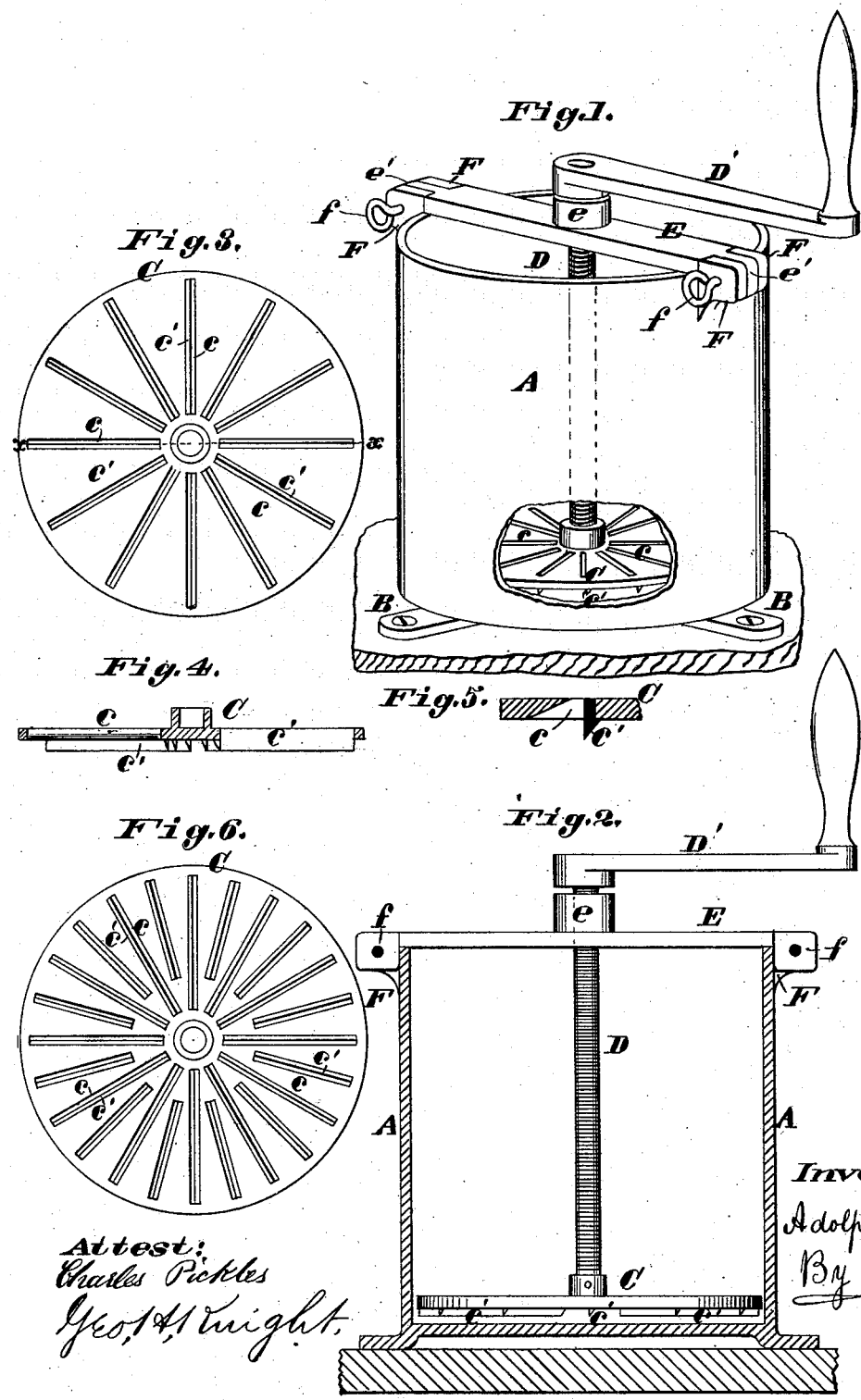
Attest:
Charles Pickles
Geo. H. Knight
Inventor.
Adolphe Hoguet
By Knight Bros.
Atty

UNITED STATES PATENT OFFICE.

ADOLPHE HOGUET, OF ST. LOUIS, MISSOURI.

MACHINE FOR MASHING POTATOES, &c.

SPECIFICATION forming part of Letters Patent No. 244,604, dated July 19, 1881.

Application filed June 10, 1881. (No model.)

*To all whom it may concern:*

Be it known that I, ADOLPHE HOGUET, of the city of St. Louis, in the State of Missouri, have invented a certain new and useful Machine for Mashing Potatoes and other Articles, of which the following is a full, clear, and exact description, reference being had to the accompanying drawings, forming part of this specification.

My improvement consists of a cylindrical vessel with a removable cross-bar across the open top, at the middle of which is a vertical screw-threaded socket or nut in which turns a screw-rod. To the lower end of the screw-rod is attached a cutter-head whose periphery fits the inside of the vessel, and which has downwardly-projecting knives or cutters, and apertures or slots at the knives to allow the ascent of the material. The construction is such that as the screw-rod is turned forward the cutter-head turns with it, and at the same time descends, so that the material below it is cut and mashed and finds its way through the slots of the cutter-head.

In the drawings, Figure 1 is a perspective view, with part of the vessel broken away to show the cutter-head. Fig. 2 is a vertical section. Fig. 3 is a bottom view of the cutter-head. Fig. 4 is a section of the head at $x\ x$, Fig. 3. Fig. 5 is an enlarged detail section transversely through one of the cutters and slots. Fig. 6 is a bottom view of a modified form of cutter-head.

A is the vessel containing the material to be mashed. The vessel may stand on legs B, and these may be constructed for attachment to a table or stand by screws, or otherwise.

C is the cutter-head or disk, whose periphery fits the interior of the vessel A. In the disk or cutter-head are a number of slots, $c$, having at one edge a downwardly-extending knife, $c'$, whose edge scrapes and cuts the material below the head as it is simultaneously forced down and rotated.

D is a screw-rod, which is firmly attached to the center of the head. The screw-rod is turned by a hand-crank, $D'$.

E is a cross-bar extending diametrically across the top of the vessel. This cross-bar has at the middle a vertical screw-threaded hole, $e$, forming a fixed nut in which the screw D turns. The cross-bar may be fixed to the vessel in any way by which it will be held firmly when in use, and which allows its easy disengagement. I show ears F upon the sides of the vessel, which have open mortises to receive the tenons $e'$ at the ends of the cross-bar. The tenons are held in the mortises by pins $f$, which pass through both the ears and the tenons.

I propose to cast the head, with its knives or cutters, in one piece; but I reserve the right to cast the head C without the knives and to attach them subsequently.

The slot $c$ and knives $c'$ are shown as straight and extending radially from the center of the head; but I do not confine myself to the form shown, as they may be curved or bent and extend in any direction that may be suitable.

The operation is as follows: The cooked potatoes, or any other cooked or raw material that is to be treated, is placed in the vessel A when the head and cross-bar have been removed. Then the head is placed in the vessel and the cross-bar E locked in position and the handle $D'$ turned forward. As the head C descends it comminutes the material which passes up through slots $c$. When the cutter-head has reached the bottom of the vessel the cross-bar is unfastened and the cutter-head and material lifted out of the vessel together, if the material has sufficient adhesiveness.

I claim as my invention—

The combination of cylindrical vessel A, cutter-head C, with slots $c$ and cutters $c'$, screw-rod D, and removable cross-bar E, with screw-threaded socket or nut $e$, all constructed substantially as set forth.

ADOLPHE HOGUET.

Witnesses:
 SAML. KNIGHT,
 GEO. H. KNIGHT.